United States Patent
Kwan et al.

(10) Patent No.: US 8,773,348 B2
(45) Date of Patent: Jul. 8, 2014

(54) MICRO PROJECTOR DRIVING DEVICE AND DRIVING METHOD

(75) Inventors: Songtaek Kwan, Shanghai (CN); Donghyub Kim, Shanghai (CN); Sungsoo Kim, Shanghai (CN)

(73) Assignee: Shanghai Sanxin Technology Development Co., Ltd., Shanghai (CN)

( * ) Notice: Subject to any disclaimer, the term of this patent is extended or adjusted under 35 U.S.C. 154(b) by 218 days.

(21) Appl. No.: 13/146,154

(22) PCT Filed: Jan. 13, 2010

(86) PCT No.: PCT/CN2010/070162
§ 371 (c)(1), (2), (4) Date: Jul. 25, 2011

(87) PCT Pub. No.: WO2010/083740
PCT Pub. Date: Jul. 29, 2010

(65) Prior Publication Data
US 2011/0285682 A1    Nov. 24, 2011

(30) Foreign Application Priority Data
Jan. 23, 2009   (CN) .......................... 2009 1 0056857

(51) Int. Cl.
G09G 3/36      (2006.01)
G03B 21/14     (2006.01)
G03B 21/12     (2006.01)
H04N 9/31      (2006.01)

(52) U.S. Cl.
CPC ............... *G03B 21/12* (2013.01); *G03B 21/14* (2013.01); *H04N 9/3173* (2013.01); *H04N 9/312* (2013.01); *H04N 9/3197* (2013.01)
USPC ............................................. 345/102; 353/85

(58) Field of Classification Search
None
See application file for complete search history.

(56) References Cited

U.S. PATENT DOCUMENTS 7,505,026 B2 *   3/2009   Baba et al. .................... 345/102
7,853,079 B1 *  12/2010   Shrivastava et al. .......... 382/173
8,454,172 B2 *   6/2013   Fujinawa et al. ............... 353/85
(Continued)

FOREIGN PATENT DOCUMENTS

CN         1684491        10/2005
CN         1936655         3/2007
(Continued)

OTHER PUBLICATIONS

International Search Report for international application No. PCT/CN2010/070162, dated 22 Apr. 2010 (5 pages).

*Primary Examiner* — Joseph Haley
(74) *Attorney, Agent, or Firm* — Hamre, Schumann, Mueller & Larson, P.C.

(57) ABSTRACT

A micro projector driving device and a driving method are provided, where pixels of the first and last images at a specified location are compared, and the light intensity of the light sources is then adjusted according to the compared results so as to avoid the continual display of images with different contrast requirements at the highest light intensity, thus saving power under a guaranteed visual effect, and prolonging the battery life of a portable micro projector. A higher power drive light source should be used for a static image rather than for a video image. Images are divided into sections, and then the pixels from each section are selected at random for comparison, therefore greatly reducing the amount of computing but still having a rather high accuracy.

14 Claims, 6 Drawing Sheets

(56) References Cited

U.S. PATENT DOCUMENTS

2008/0118147 A1* 5/2008 Lee et al. .................. 382/167
2009/0135128 A1* 5/2009 Jeon et al. .................. 345/102
2009/0256973 A1* 10/2009 Bazzani et al. ............. 348/744

FOREIGN PATENT DOCUMENTS

| CN | 201152921 | 11/2008 |
|---|---|---|
| JP | 2006251819 | 9/2006 |
| WO | 2007/040322 | 4/2007 |

* cited by examiner

MICRO PROJECTOR DRIVING DEVICE AND DRIVING METHOD

TECHNICAL FIELD

The invention relates to the projection display field, particularly to the drive technology of a micro projector.

BACKGROUND

A micro projector is a portable device having the size of for example, a cigarette box, which utilizes the light of certain intensity emitted from a light source to amplify and project images produced from a display equipment such as a light modulator to a front screen.

SUMMARY

Such a micro projector, if embedded in a mobile device such as a mobile phone, will greatly restrict the usable time of the mobile device due to the limited capacity of a rechargeable battery. To increase the usable time of a mobile device, increasing the battery capacity can be a solution, however, it can lead to an increase in volume and weight of the device.

Another method is to reduce the electricity consumption of the components of a mobile device. Regarding the components, an optical engine, which is the core part of the micro projector, consumes a large amount of electricity. Therefore, it is very important to reduce the electricity consumption of the optical engine, especially that of an optical engine for a liquid crystal display, whose light source consumes considerable amounts of electricity. Therefore, steps must be taken to reduce its electricity consumption.

However, reducing the electricity consumption of a light source will, generally render a projected image to lose some contrast ratio (CR for short) and further affect the visual effect. CR is the ratio of the luminescence at full whiteness to that at full blackness. With a high CR, images projected can be clearer. Therefore, for a micro projector, CR is a very important index.

How to reduce the electricity consumption at a guaranteed visual effect is an urgent problem to be solved for micro projectors.

A micro projector driving device and a driving method are described that can reduce the electricity consumption of a light source at a basic guaranteed visual effect.

To solve the above technical problem, one embodiment provides a driving device used in a display equipment. The display equipment includes a light modulator for image display and light sources emitting light into the light modulator, wherein the driving device is used to control the light sources and drive the light modulator, characterized in that the driving device comprises:

A detection unit, which is used to select the pixel data at a specified location of the first image signal and the last image signal within the set time section.

An interpretation unit, which is used to compare and judge the pixel data detected in the first image signal and the last image signal.

A conversion unit, which is used to convert the judgment results information of the interpretation unit into the standard signal used for adjusting the light intensity of the light sources.

A light source adjustment unit, which is used to adjust the light intensity of the light sources according to the standard signal output by the conversion unit.

The embodiment of the invention also provides a micro projector, comprising the driving device claimed in any one of claims 1~6.

The embodiment of the invention also provides a driving method for the light sources of the micro projector, comprising the following steps:

Judge whether the image being displayed is a static image or a video image.

If it is a static image, the light sources will use the first drive power.

If it is a video image, the light sources will use the second drive power.

The first drive power is higher than the second drive power.

Compared with existing technology, the main differences and effects of the micro projector driving device and the driving method described herein lie in the following process:

Compare pixels at a specified location of the first and last images, adjust the light intensity of the light sources according to the comparison results so as to avoid the continual display of images with different contrast requirements at the highest light intensity, thus saving the power under a guaranteed visual effect and prolonging the battery life of the portable micro projector.

Use a higher drive power light source for a static image than that of a video image, realizing an optimal allocation of electricity consumption.

Zone an image and select randomly the pixels in each zone for comparison, thus greatly reducing the computing amount while achieving rather high accuracy.

DETAILED DESCRIPTION

In the following description, many technical details are presented for a better understanding of the application of the invention. However, it is understandable to general technical personnel in this field that, even without these technical details and alterations and changes based on the following embodiments, the technical solution as claimed in this application can be realized.

To make the purpose, technical solution and advantages of the invention clearer, the embodiments of the invention will be further described in combination with the attached drawings.

In one embodiment, a driving device is provided for use in a display equipment. The display equipment includes a light modulator for image display and a light source emitting light into the light modulator, where the driving device is used to control the light source and drive the light modulator. In this embodiment, the display equipment is, for example, a micro projector. In other embodiments, the display equipment can be other type of display equipment as long as the display equipment includes a light modulator and a light source.

Figure 3:
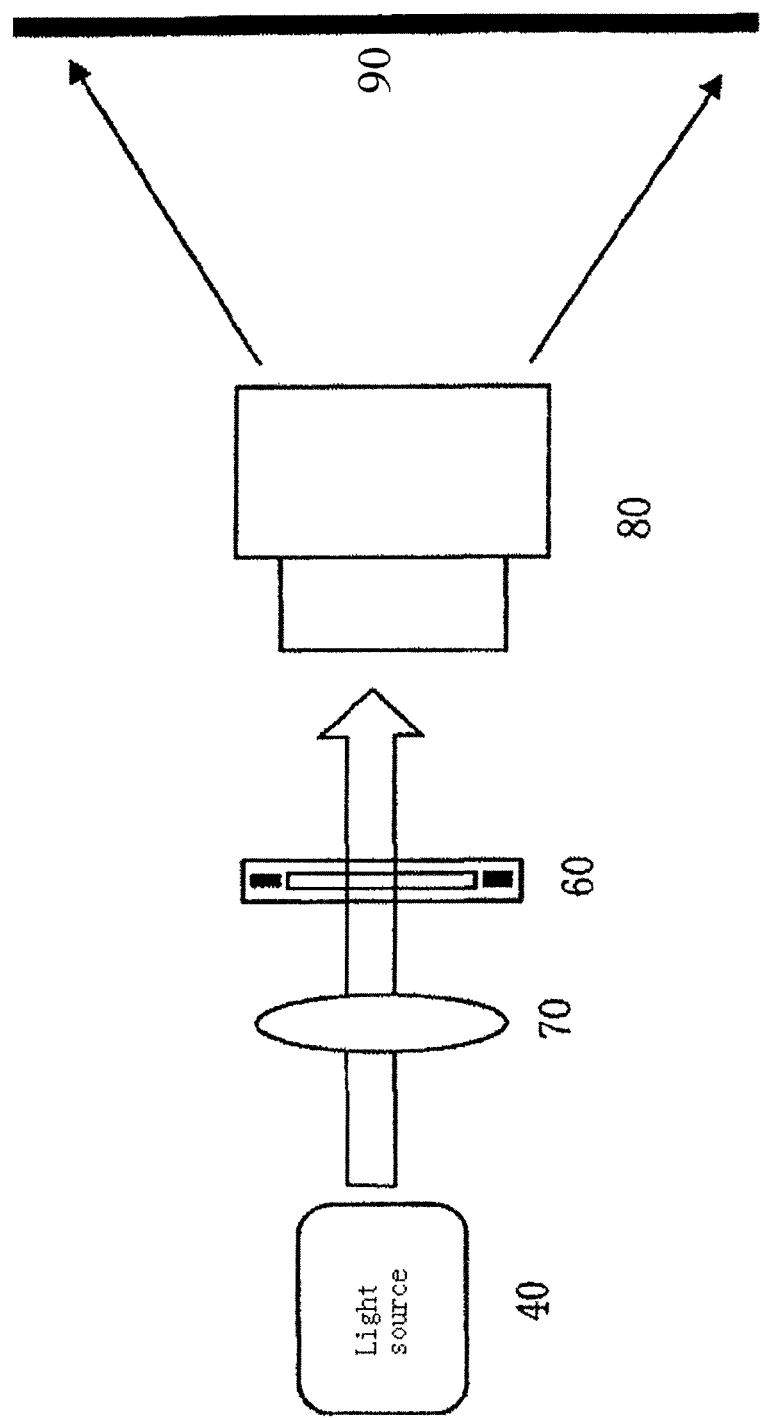
FIG. 3 is a schematic diagram of a micro projector structure.

FIG. 3 is the schematic diagram of the structure of an exemplary micro projector.

As shown in FIG. 3, light emitted from a light source 40 is collected by a light collecting lens 70 and emitted to a light modulator 60, which adjusts the emitted light of fixed intensity by transmissivity or reflection rate to finally get the required brightness and CR; the image formed in the light modulator 60 is amplified and projected to a screen 90 via a projection lens 80 for final viewers. Therefore, the image brightness and CR displayed on the screen fully depend on the intensity of the light emitted from the light source 40.

Especially, when used in a micro projector, a light source should have a small volume and be capable of emitting light of high energy. Light sources that can satisfy these requirements include a laser light source and a light-emitting diode (LED) light source. Both of the laser light source and the LED light source can emit light of high intensity under the conditions of small volume and low electricity consumption. However, laser light sources have relatively higher energy efficiency while LED sources have the advantage of relatively lower price. A laser and a LED can also be combined to form a hybrid light source.

Static images and video images (or dynamic images) have different CR requirements. Static images require a higher CR than video images do. Conventional projectors are dedicated to pictures or video and have set up the CR according to their respective purposes. But micro projectors are carried by customers and used in various circumstances, for example, for both a picture projection and a video projection. A high CR setting for all purposes will lead to an increase in electricity consumption, and a low CR setting for all purposes will lead to a blurred visual effect for static image projection. Therefore, to save electricity consumption, one embodiment of the micro projector described herein has added a function that is capable of automatic switching between CRs corresponding to a static picture or a video projection.

To get a good CR for a static image, an adjustment of a drive power is adopted. One of the ways to adjust the drive power is to increase the drive power of a light source, for example the light source 40, so as to increase the brightness of white light. On the contrary, for a video projection, the drive power of the light source is reduced to 80% to reduce the CR accordingly.

For example, a so-called normal status can be set as the highest output of the light source and the light output can be set to 80% of that at the normal status for video projections, vice versa. That is to say, the proper light output can be set as the normal status and the light output can be increased to 120% for static picture projections.

The frame rate of a light modulator such as the light modulator 60 is generally above 60 HZ. This is because the required frequency for human eyes to identify continuous images is more than 60 HZ. Therefore, image signals must be refreshed at around 60 times per second.

In the case of video images, there will be difference between the values of these 60 times/sec image signals. However, in the case of static pictures, the values can be deemed as having no change or difference. Therefore, when a time section is set, comparing the frame image signals in such a time section will differentiate a static image from a video image. In one embodiment, the time section is set to be a 60-frame section. Compare the image signal of the first frame with that of the $60^{th}$ frame. If there is no change, the image can be determined as a static image. If there is any change, the image can be determined to be a video image. It is understandable that other time sections can also be selected according to actual conditions, such as a 30-frame section, 45-frame section, 70-frame section, etc.

An internal memory in the driving device enables the storage of all image data of a frame for data comparison and interpretation.

However, if all the pixel data of image signals are collected and compared, a large internal memory capacity is needed, bringing a heavy load to a control IC. Therefore, the best way is to take sample of specific pixel data of the image signals. In one example, the resolution is of a Video Graphics Array (VGA) format, and the total number of pixels is 640×480. Therefore, when comparing the pixel data of a frame in a 60-frame section:

Along a horizontal line, the image is divided into three sections: 1-213, 214-426 and 427-640.

Along a vertical line, the image is divided into three sections: 1-160, 161-320 and 321-480.

Therefore, there are altogether 9 sections. For each comparison, one pixel is taken from each section at random so there are 9 pixels that are taken as the sampling points.

After storing the data of the 9 pixels of this frame, select the data of the pixels at the same locations in the $60^{th}$ frame thereafter, and compare and interpret the data. Such sampling points for comparison are not fixed for all comparisons but selected randomly in the 9 sections for each comparison. Therefore, it is necessary to install corresponding random function software in a detection unit (detection part) for pixel data selection from image signals.

Figure 4:
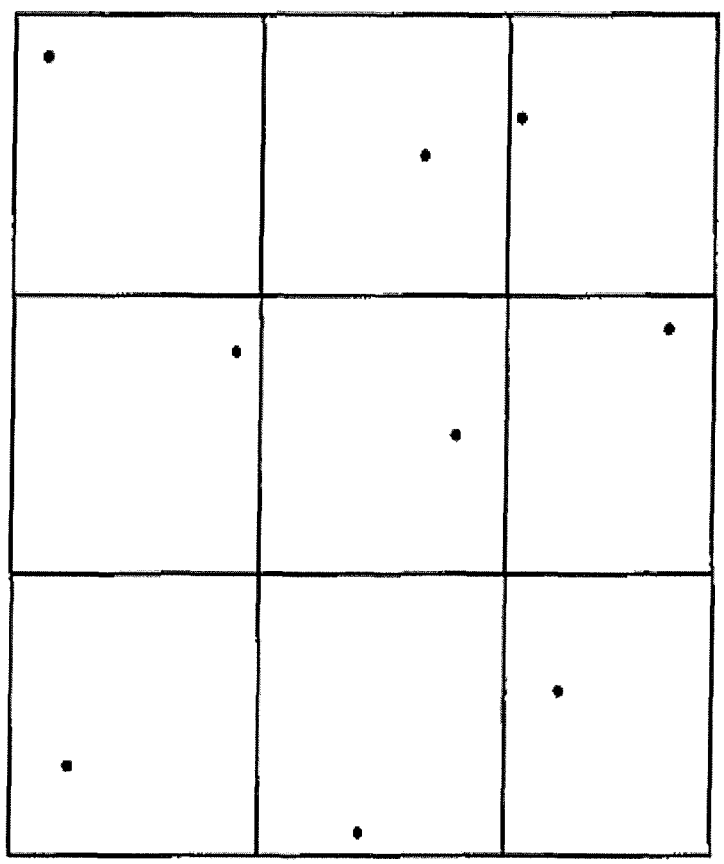
FIG. 4 is a specific pixel location distribution diagram in a comparison according to one embodiment.
Figure 5:
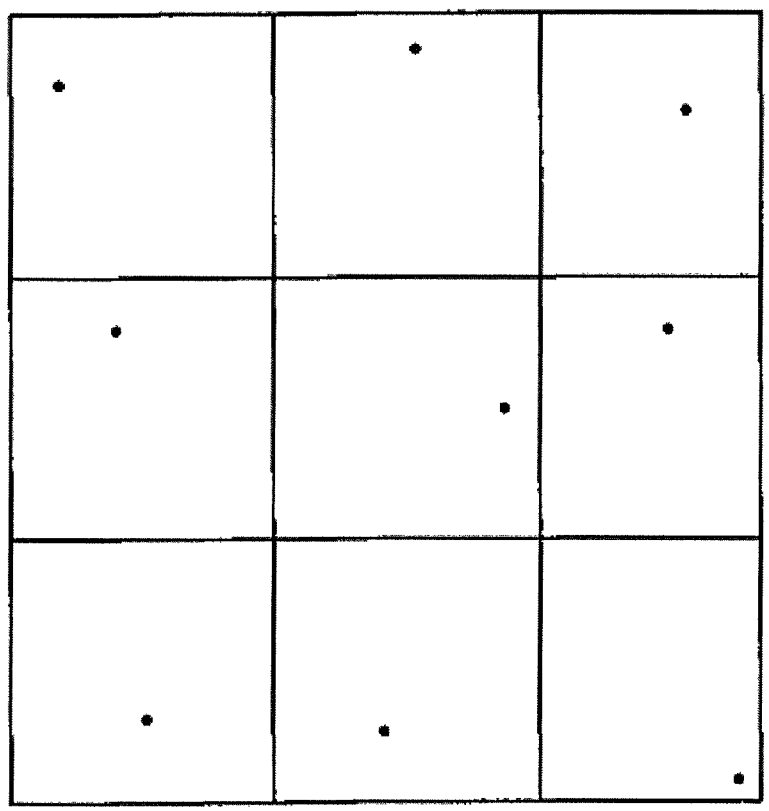
FIG. 5 is another specific pixel location distribution diagram in another comparison according to one embodiment.

For example, FIG. 4 illustrates an exemplary location layout for specific pixels for a comparison. FIG. 5 illustrates another exemplary location layout for specific pixels for anther comparison.

Dividing an image into sections and selecting randomly pixels from each section for a comparison can greatly reduce the computing amount while obtaining rather high accuracy.

In addition, it is understandable that specific pixels can also be selected by other methods. For example, select randomly N pixels in the full picture of an image, or divide an image into 4 sections and select M pixels randomly from each section, or select several pixels at fixed locations in light of picture features in specific applications, where M and N are positive integers.

A light modulator, such as the light modulator 60, refers to a component that forms image pictures by selectively passing, blocking or changing the optical path of emitted light. Typical examples of the light modulator 60 include a digital micro-mirror device (DMD), a liquid crystal display (LCD), a liquid crystal on silicon (LCOS), etc.

DMD is a component used in a digital light processing (DLP) projector, which adopts a field sequential drive mode and uses digital mirrors in a matrix arrangement, whose number is the same as the pixel number. DLP refers to a projector that adjusts the optical path of the light emitted from a light source by digital mirrors and uses baffle reflection to realize gradation or form an image.

LCD refers to a component that forms images by selectively switching on/off liquid crystals. The projectors using LCD components are of various types, such as a direct-view type projector, a projection type projector and a reflection type projector. In the case of a direct-view type projector, the background light of the LCD component forms an image via an LCD panel that can be directly viewed; in the case of a projection type projector, the image formed by the LCD component is amplified and projected to a screen by a projection lens; a reflection type projector has a structure basically the same as that of a projection type projector, and their difference lies in that a reflection film is provided on a base-plate below the LCD and the reflected light is amplified and projected to a screen.

LCOS belongs to reflection type LCDs, which turns the lower base-plate of the two base-plates at the LCD end from a transparent glass plate to a silicon-base plate and operates in a reflection mode.

The driving device of the micro projector described herein can be used for all the above mentioned types of display panels.

In one embodiment, the projection lens 80 is composed of several lenses, and amplifies and projects an image formed by a light modulator such as the light modulator 60 to a screen such as the screen 90.

Figure 1:
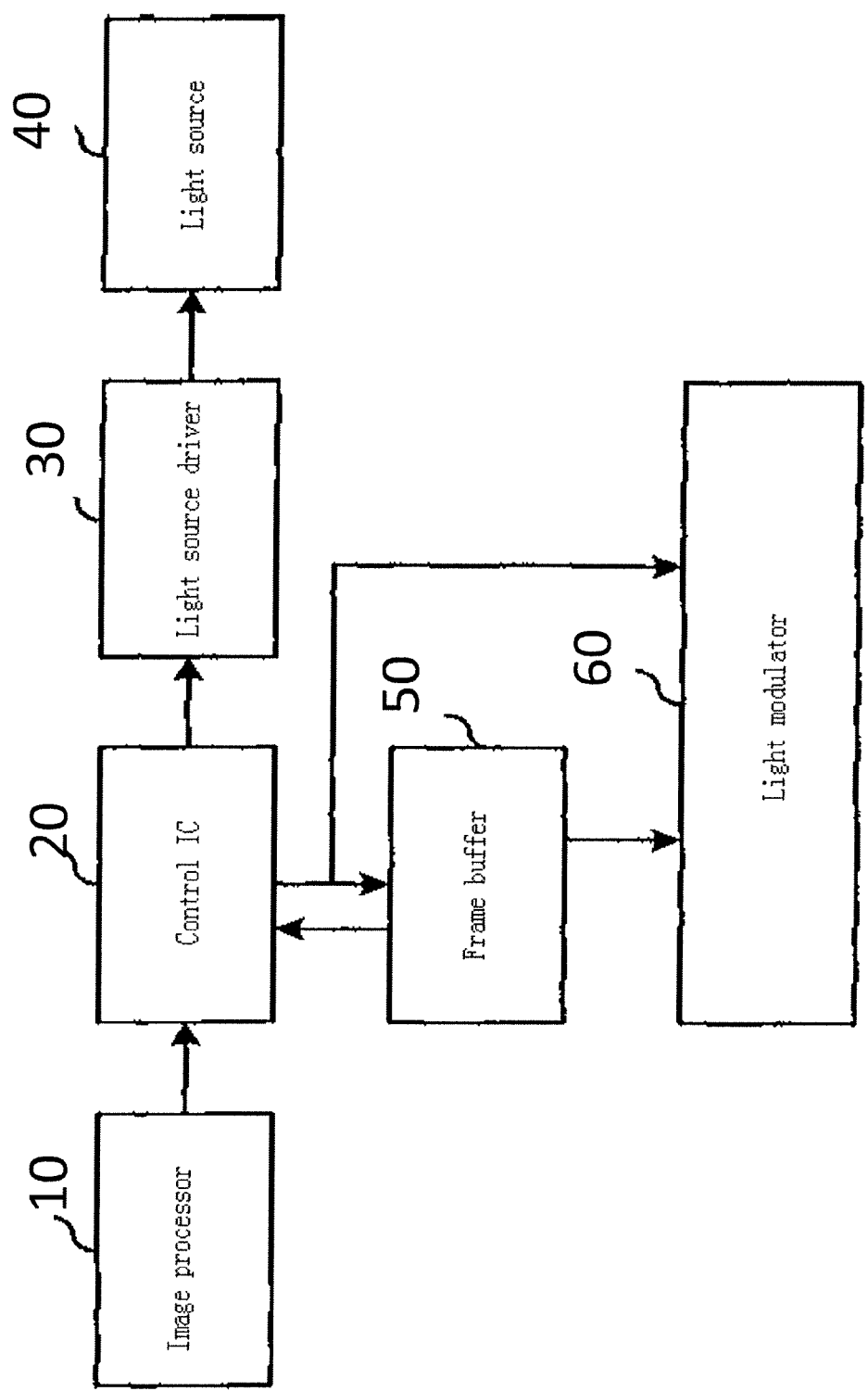
FIG. 1 is a schematic diagram of an exemplary drive process of a micro projector according to one embodiment.

FIG. 1 is a schematic diagram of an exemplary drive process for a driving device of a field sequential micro projector, such as the micro projector of FIG. 3.

The driving device of the micro projector comprises an image processor 10, a control IC 20, a light source driver 30, a frame buffer 50 and a light modulator 60.

An image frame is input to the control IC 20 by the image processor 10. In one embodiment, the control IC 20 functions as a video processor.

The light source 40 of this embodiment can be a RGB (red, green and blue) LED or a laser. High pressure mercury light or fluorescent light were also used as a light source previously. However, it is hard to adjust their light intensity. The light intensity of LEDs and lasers is easy to adjust and therefore, is suitable for this embodiment.

In a field sequential display mode, a frame time is divided into red/green/blue sub-frames, and image data of each color are driven respectively in sub-frame time sections. Therefore, the frame rate is 180 Hz for an original 60 Hz frame rate, and human eyes will combine the lights of various colors and identify them into a complete color image. As shown in FIG. 1, when an image in the $(n-1)^{th}$ frame is driven in a display panel, the image signal of the $n^{th}$ frame input into the image processor 10 will be moved and stored in the frame buffer 50 temporarily. In this embodiment, the light source 40 includes three light sources. In other embodiments, the number of light sources can be different, for example one light source. Generally, if the number of light sources is K, a light modulator such as the light modulator 60 will divide the time of a frame into K sections, with each section displaying an image signal corresponding to a light source and K being a positive integer.

Similarly, when the $n^{th}$ image data stored in the frame buffer 50 is driven in the display panel, the $(n+1)^{th}$ image data will be stored in the frame buffer 50 in sequence. According to this time sequence of image data, a drive chip drives the light source driver 30 to get the light source 40 to emit light in coordination with the light modulator 60.

Figure 2:
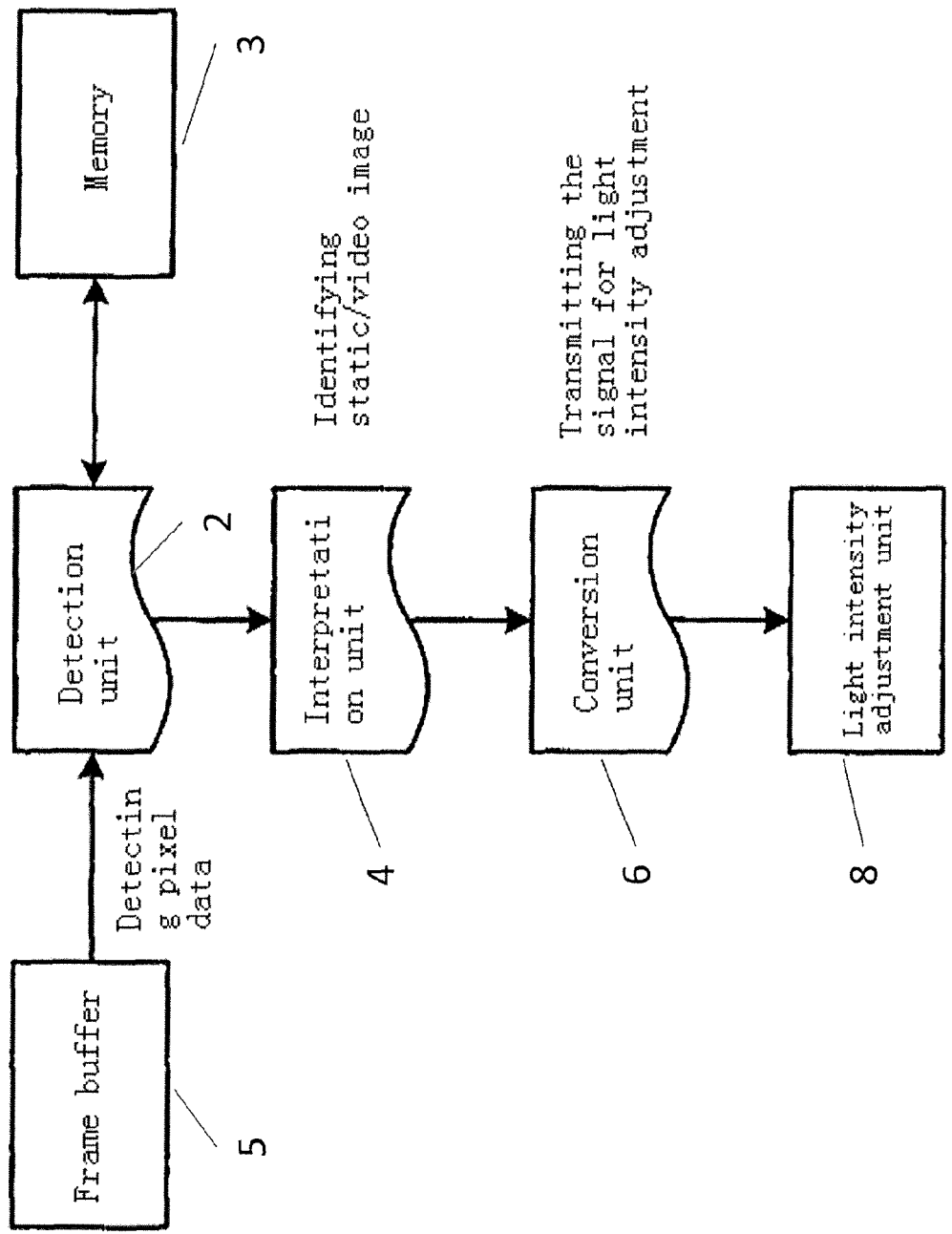
FIG. 2 is a schematic diagram of an exemplary system driving device of the micro projector in FIG. 1.

As shown in FIG. 2, in one embodiment, a micro projector driving device, such as the driving device in FIG. 1, includes a detection unit 2, which takes sample pixel data at a specific location in the frames (for example, the $1^{st}$ frame and the $60^{th}$ frame) of a section from the image signals recorded in a frame buffer 5 and stores them in an internal memory 3; an interpretation unit 4, which compares the pixel data of the $1^{st}$ image frame signal with that of the $60^{th}$ image frame signal and determines whether they are identical; and a light source conversion unit 6, which converts a standard signal for adjusting the light intensity of the light sources according to the judgment information, so as to realize the adoption of different light source drive states for static images and for video images, respectively.

In this embodiment, the detection unit 2, the interpretation unit 4 and the conversion unit 6 are embedded in an on-chip form in a control IC such as the control IC 20 where the control IC 20 can function as a video processor. It is understandable that the detection unit 2, the interpretation unit 4 and the conversion unit 6 are all logic units and can be physically realized in various ways. In addition to embedding in a control IC in an on-chip form, they can also be realized in a separate chip or via software.

In this embodiment, the determining of an image whether it is a video or a static image is carried out by analyzing image signals input into a frame buffer such as the frame buffer 50, and a light source drive such as the light source drive 40 is adjusted according to predetermined light source drive conditions, thus realizing an optimal allocation of electricity consumption.

Figure 6:
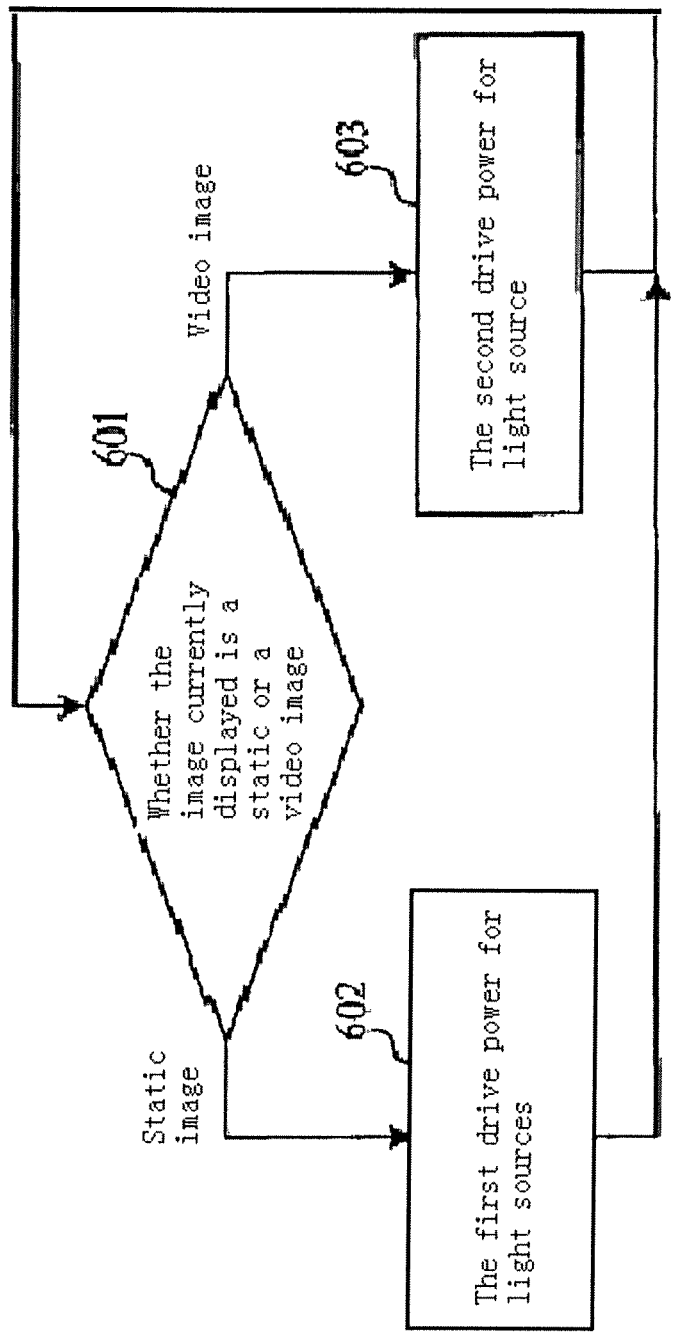
FIG. 6 is a schematic diagram of a process of an exemplary light source driving method of a micro projector.

Another embodiment provides a light source driving method for a micro projector. The method is shown in FIG. 6.

In Step 601, determine whether an image currently displayed is a static image or a video image.

If it is a static image, enter Step 602, and use a first drive power for a light source.

If it is a video image, enter Step 603, and use a second drive power for the light source.

The first drive power is higher than the second drive power. Generally, the second drive power is 75%~85% the power of the first drive power, and of course, can be set up into other proportions. In a typical example, the second drive power is 80% of the first drive power.

When Step 602 or Step 603 is completed, return to Step 601 for next determination.

Using a higher power to drive the light source for a static image compared to that of a video image can realize an optimal allocation of electricity consumption.

In a preferred embodiment, Step 601 includes the following sub-steps:

Select pixel data at a specific location of the first image frame signal and the last image frame signal within a determined time section (such as a 60-frame time section).

Compare the pixel data detected from the first image frame signal with those from the last image frame signal. If they are identical, the image is a static image; if they are not identical, the image is a video image.

Based on the comparison of the pixels at the specific location of the first and last images, adjust the light intensity of the light source according to the comparison results so as to avoid a continual display of images with different contrast requirements at the highest light intensity, thus saving the power under a guaranteed visual effect and prolonging the battery life of the portable micro projector.

It is understandable that other determination methods can also be used. For example, do a subtraction between the corresponding pixels of the first and last images. If the result is not zero, the image is a video image. If the result is zero, the image is a static image. In another example, a mark can be preset in an image generation to represent whether an image is a static image or a video image, and the image type will be directly known according to the displayed mark.

In this embodiment, a specific location refers to the location of a pixel selected in each of the 9 sections of an image divided into three equal parts in both horizontal and vertical directions. In other embodiments, the specific pixels can also be selected by other methods. For example, select randomly N pixels from the entire picture, or divide the image into 4 sections and select M pixels randomly from each section, or select several pixels at fixed locations in light of the picture features in specific applications, where M and N are positive integers.

The above embodiments of the driving device and the method correspond to each other and can be used in combination. The relevant technical details mentioned in the embodiment of the device are also valid for the embodiment of the method and are not repeated therein. Correspondingly, the relevant technical details mentioned in the embodiment of the method are also applicable in the embodiment of the device.

The embodiments of the invention can be realized via software, hardware or firmware, etc. No matter which one of these methods is used to realize the invention, the instruction codes will be stored in a memory (such as permanent or alterable, volatile or non-volatile, solid state or non-solid state, fixed or changeable medium) accessible by any type of computer. Similarly, the memory can be a programmable array logic (PAL), a random access memory (RAM), a programmable read only memory (PROM), a read-only memory (ROM), an electrically erasable programmable ROM (EE-PROM), a magnetic disc, an optical disc, a digital versatile disc (DVD), etc.

Though the invention is illustrated and described by some preferred embodiments, it should be understandable to the general technical personnel of this field that the forms and details can be changed in various ways without deviating from the spirit and scope of the invention.

The invention claimed is:

1. A driving device used in a display equipment, the display equipment comprising a light modulator for image display and a light source emitting light into the light modulator, wherein the driving device is used to control the light source and drive the light modulator, the driving device comprising:
   a detection unit, which is used to select pixel data at a specified location of a first image signal and a last image signal of an image currently displayed within a determined time section;
   an interpretation unit, which is used to compare and interpret the pixel data detected in the first image signal and the last image signal;
   a conversion unit, which is used to convert an interpretation results information of the interpretation unit into a standard signal used for adjusting the light intensity of the light source; and
   a light source adjustment unit, which is used to adjust the light intensity of the light source according to the standard signal of the conversion unit,
   wherein when the judgment result of the interpretation unit is that the pixel data detected from the first image signal and from the last image signal are the same and the image is a static image, the light source conversion unit outputs a standard signal corresponding to a first drive power; otherwise, when the image is a video image, the light source conversion unit outputs a standard signal corresponding to a second drive power, wherein the first drive power is higher than the second drive power.

2. The driving device according to claim 1, wherein the detection unit, the interpretation unit and the conversion unit are integrated in a control IC.

3. The driving device according to claim 2, wherein the control IC converts the input electrical signals into image signals and outputs them.

4. The driving device according to claim 1, wherein the set time section is a 60-frame section.

5. The driving device according to claim 1, wherein the specified location refers to the pixel location chosen at random for each comparison from each of nine zones resulting from the division of an image into three equal parts in horizontal and vertical directions.

6. The driving device according to claim 1, wherein the light source includes a laser, or a LED, or laser and LED hybrid based light sources.

7. The driving device according to claim 1, wherein the light source includes a plurality of light sources in a number of K; the light modulator divides the time of each frame into K sections, and each section displays an image signal corresponding to a light source, wherein K is a positive integer.

8. The driving device according to claim 1, wherein the light modulator is one of the following types:
   liquid crystal display, digital micro-mirror device, or liquid crystal on silicon.

9. A micro projector comprising the driving device according to claim 1.

10. A driving method for light sources of a micro projector comprising a driving device of claim 1, the driving method comprising:
    determining whether an image currently displayed is a static image or a video image;
    when the image is a static image, a light sources using the first drive power; and
    when the image is a video image, the light sources use using the second drive power,
    wherein the first drive power is higher than the second drive power.

11. The driving method according to claim 10, wherein the second drive power is 75%-85% of that of the first drive power.

12. The driving method according to claim 10, wherein the judgment of whether the image being displayed is a static image or a video image comprises the following steps:
    selecting the specific pixel data from the first image signal and the last image signal in the set time section,
    comparing the pixel data detected from the first image signal with those from the last image signal, if the data is the same, the image is static and if the data is different, the image is a motion image.

13. The driving method according to claim 12, wherein the set time section is a 60-frame section.

14. The driving method according to claim 12, wherein the specified location refers to the pixel location chosen at random for each comparison from each of nine zones resulting from the division of an image into three equal parts in horizontal and vertical directions.

* * * * *